United States Patent [19]

Choi

[11] Patent Number: 5,359,312

[45] Date of Patent: Oct. 25, 1994

[54] ROTARY TRANSFORMER ASSEMBLY FOR ROTARY HEAD DRUM DEVICE

[75] Inventor: Young C. Choi, Kyungki, Rep. of Korea

[73] Assignee: Goldstar Co., Ltd, Rep. of Korea

[21] Appl. No.: 924,100

[22] Filed: Aug. 3, 1992

[30] Foreign Application Priority Data

Aug. 3, 1991 [KR] Rep. of Korea ............... 12403/1991

[51] Int. Cl.$^5$ ............................................. H01F 15/04
[52] U.S. Cl. ................................... 336/84 M; 336/120
[58] Field of Search ................. 336/120, 84 R, 84 C, 336/84 M, 117, 118, 119, 122, 123

[56] References Cited

U.S. PATENT DOCUMENTS

| | | | |
|---|---|---|---|
| 3,317,873 | 5/1967 | Himmelstein et al. | 336/120 |
| 3,531,749 | 9/1970 | Tveter et al. | 336/120 |
| 5,055,775 | 10/1991 | Scherz et al. | 336/120 |

FOREIGN PATENT DOCUMENTS

| | | | |
|---|---|---|---|
| 61-164210 | 12/1986 | Japan | 336/120 |
| 63-13309 | 1/1988 | Japan | 336/120 |
| 63-67711 | 3/1988 | Japan | 336/120 |
| 2-128408 | 5/1990 | Japan | 336/120 |

*Primary Examiner*—Thomas J. Kozma
*Attorney, Agent, or Firm*—Ostrolenk, Faber, Gerb & Stoffen

[57] ABSTRACT

A rotary transformer assembly of a rotary head drum device, comprising a plurality of concentric circular shielding walls for isolating adjacent pairs of channels from each other so as to prevent a leakage of electromotive force between the pairs of channels and a plurality of concentric circular slots for receiving the ends of the shielding walls so as to isolate the adjacent pairs of channels from each other in combination with the shielding walls. The shielding walls are provided at one of the transformer rotor and the transformer stator as protruding at the outer side of the outermost channel, at the inner side of the innermost channel and at a position between each adjacent pairs of channels. The slots are provided at portions, corresponding to the shielding walls, of the other of the transformer rotor and the transformer stator. This rotary transformer assembly prevents a leakage of electromotive force between adjacent pairs of channels by virtue of the shielding walls, thereby preventing generation of a cross torque and, in this respect, providing a stable video signal transfer without generation of noise.

3 Claims, 3 Drawing Sheets

ROTARY TRANSFORMER ASSEMBLY FOR ROTARY HEAD DRUM DEVICE

BACKGROUND OF THE INVENTION

1. Field of the Invention

The present invention relates in general to a rotary head drum device equipped in a video cassette recorder or an integrated system of camera/video cassette recorder, and more particularly to a rotary transformer assembly of such a rotary head drum device which is provided with a shielding wall for preventing leakage of electromotive force between adjacent pairs of channels, thereby preventing generation of cross torque therebetween and, in this respect, providing a stable video signal transfer without generation of noise.

2. Description of the Prior Art

With reference to FIG. 1 showing an elevational sectioned construction of a known rotary head drum device for a video cassette recorder, the known head drum device generally comprises an upper rotary drum 4, which is mounted on a rotating flange 3 fixed to a rotating shaft 2 of a drum drive motor 1. In addition, under the upper rotary drum 4 a predetermined number, for example, 2 or 4, of heads 5 are mounted so as to be circumferentially disposed at the side surface of the drum device and spaced apart from each other at a predetermined angle. A transformer rotor 10 is fixed to the under surface of the flange 3 of the rotating shaft 2, while both a leg relay 6 and a disk relay 7 are mounted on the upper rotary drum 4 so as to cause the video signals to be transferred between the heads 5 and the transformer rotor 10. On the other hand, at a position downwardly spaced apart from the upper rotary drum 4 by a predetermined distance, a lower stationary drum 8 is arranged. The drum drive motor 1 is disposed at a position under the lower stationary drum 8, while a transformer stator 20 is fixedly disposed on the lower stationary drum 8 so as to face to the transformer rotor 10 with a minute space formed therebetween. In result, the video signals are transferred between the upper rotary drum 4 and the lower stationary drum 8. Conventionally, the transformer stator 20 is also electrically connected to a recording/playback signal processing circuit (not shown) by means of a signal transferring cable 9.

Here, the aforementioned transformer rotor 10 and the transformer stator 20 face to each other and constitute a rotary transformer assembly as shown in FIG. 2. Referring to this drawing, the transformer rotor 10 (hereinafter, referred to simply as "the rotor") and the transformer stator 20 (hereinafter, referred to simply as "the stator") are disposed so as to be spaced apart from each other with a predetermined space formed therebetween and each has a plurality of channels 11 or 21 which form a plurality of concentric circular slots as shown in FIG. 3. On the bottoms of the channels 11 and 21, coils 12 or 22 are arranged, respectively. Here, the one group of channels, for example, the channels 11 of the rotor 10 (hereinafter, referred to simply as "the rotor channels"), are formed so as to face to the other group of channels, for example, the channels 22 of the stator 20 (hereinafter, referred to simply as "the stator channels"). Therefore, a magnetic field is induced between each pair of channels, comprising a rotor channel 11 and a stator channel 21 which are facing to each other, by virtue of the coils 12 and 22 thereof and this permits a video signal to be transferred between this pair of channels 11 and 21.

The operation of the known rotary head drum device having the aforementioned construction will be described as follows.

In the case of recording or playback mode of the video cassette recorder, the upper rotary drum 4 of the rotary head drum device is rotated by the driving force of the drum drive motor 1 and this causes the heads 5 disposed at the circumferential surface of the rotary head drum 4 to play back the video signals recorded on the video tape or to record the video signals on the video tape as they revolve under the condition that they come into close contact with the video tape.

Here, the signal transfer between the upper rotary drum 4 and the lower stationary drum 8 is carried out by the rotary transformer assembly in which the coils 12 and 22, each arranged on the bottom of its corresponding channel 11 or 21, cause a magnetic field to be induced between the transformer rotor 10, which rotates together with the rotating flange 3, and the transformer stator 20, which is fixed to the lower stationary drum 8, thereby permitting the video signals to be transferred between the transformer rotor 10 and the transformer stator 20.

That is, when the electric currents in the coils 12 and 22 inside the channels 11 and 21, these channels 11 and 21 facing to each other, vary in their values, the magnetic fluxes across the sectioned areas of the coils 12 and 21 vary, thereby causing an electromotive force to be electromagnetically induced between the coils 12 and 22 due to a potential difference therebetween. Here, in order to cause the electromotive force induced between the coils 12 and 22 to make the electricity be transferred from a coil 12 or 22 of high electric potential to the other coil 22 or 12 of low electric potential, it is necessary to dispose the transformer rotor 10 and the transformer stator 20 so as to closely face each other so that the electromotive force makes the electricity be transferred from the coil 12 or 22 of high electric potential to the other coil 22 or 12 of low electric potential.

However, in such a known rotary transformer assembly of the rotary head drum device, the transformer rotor 10 and the transformer stator 20 are disposed so as to closely face to each other as described above so that the known transformer assembly provides a minute gap, through which the electromotive force induced between the coils 12 and 22 in a pair of channels 11 and 21, which are faced to each other, leaks out, to another pairs of channels 11 and 21 which are adjacent to the pair of channels 11 and 21. Thus, the adjacent pairs of channels 11 and 21 are conventionally affected by the leaked electromotive force and this causes a cross torque to be generated in the adjacent pairs of channels 11 and 21, thereby introducing noise in the video signal.

In an effort to solve the generation of such a cross torque, it has been proposed to widen the interval between the adjacent pairs of channels or to apply at least one short ring to the rotary transformer assembly.

However, to widen the interval between the adjacent pairs of channels 11 and 21 of the rotary transformer assembly detrimentally affects the whole size of the rotary head drum device and, in this respects, impairs the compactness of the final products, such as video cassette recorders, equipped with such a rotary head drum device. As a result, there is a restriction in the widening the interval between the adjacent pairs of channels 11 and 21 so that it is impossible to efficiently prevent the generation of the cross torque caused by the electromotive force which leaks out between the adjacent pairs of channels 11 and 21.

On the other hand, in order to apply the short ring to the known rotary transformer assembly, a conductive short ring 25 may be additionally arranged between adjacent stator channels 21 formed in the transformer stator 20, as depicted in FIG. 3. This short ring 25 is adapted to prevent the electromotive force from leaking out between the adjacent pairs of channels 11 and 21 and, in this respect, to prevent the generation of cross torque caused by the leaked electromotive force. Here, it is noted that the short ring 25 may be arranged at the transformer rotor 10 instead of the aforementioned transformer stator 20. This short ring 25 is conventionally made of a conductive material, such as a copper wire, which can receive the electromotive force. At this time, it may be considered that it is more efficient when a short ring 25 is arranged at each interval between adjacent pairs of channels 11 and 21, however, in this case, each interval between adjacent pairs of channels 11 and 21 of the rotary transformer assembly is inevitably widened. Therefore, one or two short rings 25 are conventionally arranged in the known rotary transformer assembly.

The short ring 25 disposed at the interval between the adjacent pairs of channels 11 and 21 additionally functions as an earthing ring by which the electromotive force, which wants to leak out from a pair of channels 11 and 21 of the adjacent pairs toward the other pair of channels 11 and 21 of the adjacent pairs, is absorbed before it affects the other pair of channels 11 and 21. Thus, this short ring 25 prevents the generation of the cross torque which is caused by the leaked electromotive force and causes noise in the video signal.

However, in applying the short ring 25 to the rotary transformer assembly, the short ring 25 inevitably occupies an area of the rotary transformer assembly so that it is impossible to provide the short ring 25 for each interval between each two adjacent pairs of channels 11 and 21 as mentioned above. Hence, this type of known rotary transformer assembly has a disadvantage in that applying of the short ring 25 can not prevent all of the leakage of the electromotive force, each occurring between each adjacent pairs of channels 11 and 21. Furthermore, this short ring 25 detrimentally affects the adjacent pairs of channels 11 and 21, between which the short ring 25 is arranged, due to its function as the earthing ring which can absorb the electromotive force as aforementioned, thus weakening the signal intensity. In addition, even though this short ring 25 is intended to prevent the electromotive force from leaking out between the adjacent pairs of channels 11 and 21 by virtue of its function as the earthing ring which can absorb the leaked electromotive force, but it does not practically exhibit excellent results in preventing the leakage of the electromotive force.

SUMMARY OF THE INVENTION

It is, therefore, an object of the present invention to provide a rotary transformer assembly of a rotary head drum device which is provided with a plurality of shielding walls each disposed between each two adjacent pairs of channels in order to prevent a leakage of electromotive force between the adjacent pairs of channels, thereby preventing the generation of a cross torque in the assembly and, in this respect, preventing a mutual interference of the video signals.

The above-described object of the present invention can be accomplished by providing a rotary transformer assembly of a rotary head drum device for a magnetic recording/playback system, comprising a transformer rotor mounted on an upper rotary drum of the drum device and a transformer stator mounted on a lower stationary drum of said device, these transformer rotor and transformer stator being disposed so as to face to each other with a predetermined space formed therebetween and having at their facing surfaces a plurality of channels, respectively, which are such disposed that each channel of the transformer rotor faces to each channel of the transformer stator in order to provide a pair of channels, the improvement comprises, in combination, a plurality of concentric circular shielding walls for isolating adjacent pairs of channels from each other so as to prevent a leakage of electromotive force between the adjacent pairs of channels, which are provided at one of the transformer rotor and the transformer stator as protruding at the outer side of the outermost channel, at the inner side of the innermost channel and at a position between each adjacent pairs of channels; and a plurality of concentric circular slots for receiving the ends of the shielding walls so as to isolate the adjacent pairs of channels from each other in combination with the shielding walls, each said slot being provided at a portion, corresponding to each shielding wall, of the other of the transformer rotor and the transformer stator.

In accordance with the rotary transformer assembly of this invention, an electromotive force is induced, according to the rotation of the transformer rotor for playing back or recording the video signal, between a pair of channels comprising a rotor channel and a corresponding stator channel, thereby causing a video signal to be transferred between the pair of channels. At this time, the circular shielding wall formed between each two adjacent pairs of channels causes the electromotive force induced between each pair of channels to be prevented from leaking out to the adjacent pair of channels. In result, the electricity is stably transferred from a coil of high electric potential to the other coil of low electric potential, thus reliably preventing the signal interference between the adjacent pairs of channels of the rotary transformer assembly.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
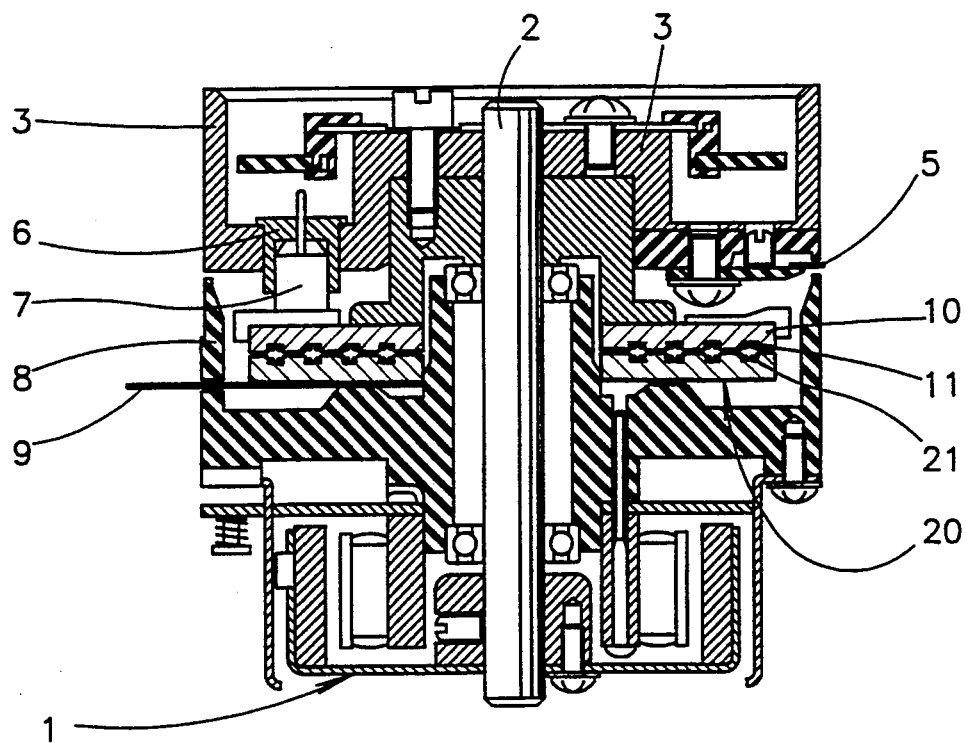
FIG. 1 is an elevational sectioned view showing a construction of an embodiment of a known rotary head drum device for a magnetic recording/playback system.
Figure 2:
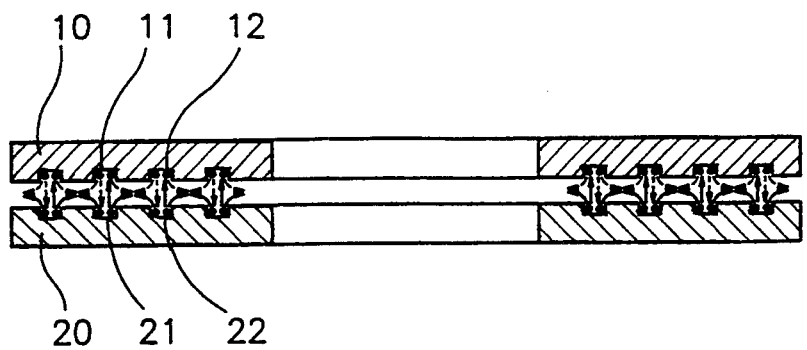
FIG. 2 is an enlarged sectioned view of an embodiment of a known rotary transformer assembly of the rotary head drum device of FIG. 1.
Figure 3:
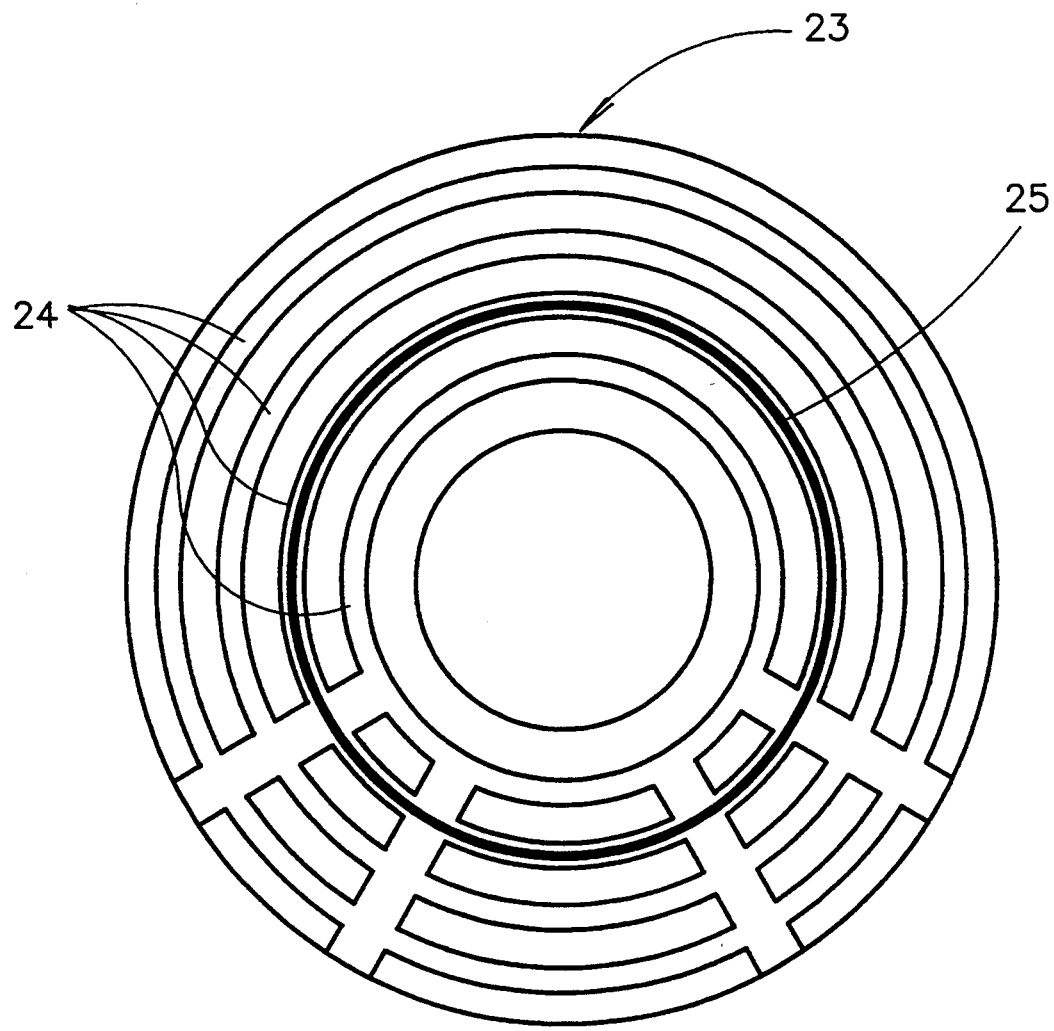
FIG. 3 is a plane view of another embodiment, which is provided with a short ring, of a transformer stator of the known rotary transformer assembly.
Figure 4:
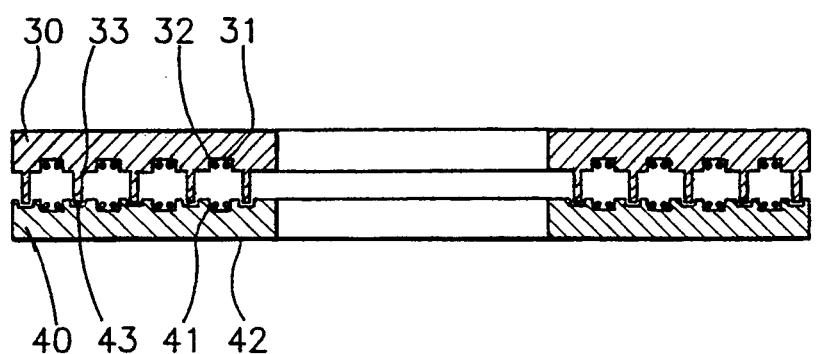
FIG. 4 is a view corresponding to FIG. 2, but showing an embodiment of the present invention.
Figure 5:
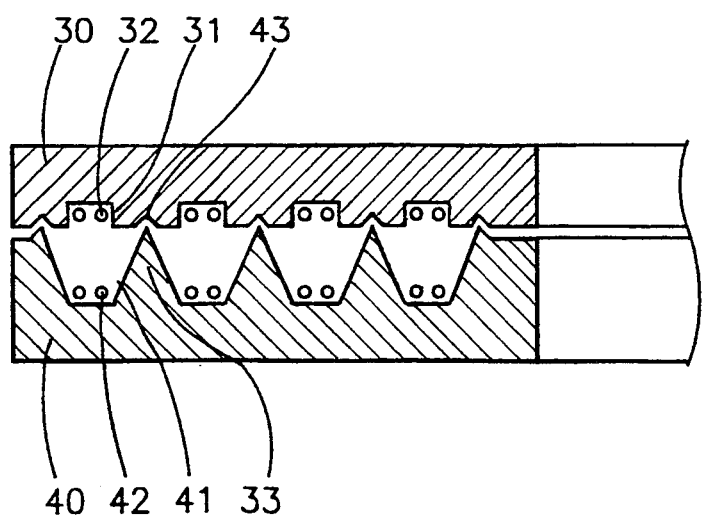
FIG. 5 is a part of a sectioned view of another embodiment of the rotary transformer assembly of the rotary head drum device in accordance with the present invention.

In the rotary head drum device in accordance with this invention, the general shape of the device remains the same as in the aforementioned known device shown in FIG. 1, but the construction of the rotary transformer assembly are improved to solve the above-mentioned disadvantages, therefore, the detailed description for the general shape of the device of this invention except for the rotary transformer assembly is efficiently omitted from the referred drawings, FIGS. 4 and 5.

Referring first to FIG. 4 showing an embodiment of a rotary transformer assembly of the rotary head drum device in accordance with this invention, the present assembly comprises a transformer rotor 30 and a transformer stator 40 both of which are disposed between an upper rotary drum (not shown) and a lower stationary drum (not shown). Here, the transformer rotor 30 and the transformer stator 40 are arranged so as to form a predetermined space therebetween and to face to each other. In addition, the transformer rotor 30 and the transformer stator 40 each has a plurality of channels 31 or 41 which are formed as concentric circular slots in each bottom of which a coil 32 or 42 is arranged. Each of the one group of channels, for example, each rotor channel 31, is disposed so as to face a corresponding channel of the other group of channels, for example, each stator channel 41. On the other hand, the transformer rotor 30 is provided with a plurality of concentric circular shielding walls 33 each of which is integrally formed with the transformer rotor 30 as vertically downwardly extending from the outer side of the outermost rotor channel 31, from the inner side of the innermost rotor channel 31 or from a position between each adjacent pair of rotor channels 31. In this case, the transformer stator 40 is provided with a plurality of concentric circular slots 43 each of which is formed as vertically depressed at the outer side of the outermost stator channel 41, at the inner side of the innermost stator channel 41 or at a position between each pair of adjacent stator channels 41 so as to correspond to each of the shielding wall 33. Therefore, when the transformer rotor 30 and the transformer stator 40 are assembled with each other in order to constitute the rotary transformer assembly of this invention, the lower end of each shielding wall 33 of the transformer rotor 30 is accurately inserted in each corresponding slots 43 of the transformer stator 40.

As a result, the rotary transformer assembly of this invention is constructed to reliably block the minute gaps, each formed between each pairs of channels 31 and 41 and between the transformer rotor 30 and the transformer stator 40, by means of the aforementioned concentric circular shielding walls 33, thereby preventing the adjacent pairs of channels 31 and 41 from communicating with each other.

Thus, when the transformer rotor 30 starts its rotation in order to play back or record the video signal, as described above an electromotive force is induced between a pair of channels comprising a rotor channel 31 of the transformer rotor 30 and a corresponding stator channel 41 of the transformer stator 40, thereby causing a video signal to be transferred between the pair of channels 31 and 41. At this time, a circular shielding wall 33 is formed between each two adjacent pairs of channels 31 and 41, for example, between a first pair of channels 31 and 41, these channels facing to each other, and a second pair of channels 31 and 41, these channels also facing to each other and being disposed to be adjacent to the first pair of channels 31 and 41 at the right or left side of the first pair of channels 31 and 41. As a result, the electromotive force induced between each pair of channels 31 and 41, for example, the first pair of channels, is prevented from leaking out to the adjacent pair of channels 31 and 41, for example, the second pair of channels. The electromotive force induced between the coils 32 and 42 arranged in the channels 31 and 41, these channels facing to each other, accurately causes the electricity to be transferred from a coil 32 or 42 of high electric potential to the other coil 42 or 32 of low electric potential without leaking from this pair of channels 31 and 41 to an adjacent pair of channels 31 and 41, thus reliably preventing the signal interference between the adjacent pairs of channels 31 and 41.

On the other hand, differently from the primary embodiment shown in FIG. 4, the rotary transformer assembly of this invention may have a plurality of concentric circular shielding walls 33 each of which is integrally formed with the transformer stator 40 as upwardly extending from the outer side of the outermost stator channel 41, from the inner side of the innermost stator channel 41 or from a portion between each pair of adjacent stator channels 41. In order to combine with the concentric circular shielding walls 33, the transformer rotor 30 is provided with a plurality of concentric circular slots 43 each corresponding to each of the shielding walls 33. In this second alternate embodiment, the same effect of preventing the leakage of electromotive force as described in the primary embodiment can be accomplished.

Here, as shown in FIG. 4 the elevational sectioned shape of each shielding wall 33 is constructed to have a rectangular shape. However, besides the rectangular shape the shielding wall 33 may have another elevational sectioned shape, for example, a triangular shape or a semicircular shape.

As shown in FIG. 5, a portion between each pair of adjacent stator channels 41 of the transformer stator 40 may be constructed to have a triangular elevational sectioned shape, thereby providing a tapered shielding wall 33 between each adjacent stator channels 41. In order to combine with the shape of the wall 33, each depression 43 formed at the transformer rotor 30 has a triangular elevational sectioned shape so as to receive the upper end of the corresponding shielding wall 33 when the rotor 30 and the stator 40 are assembled with each other in order to constitute the rotary transformer assembly. In result, the adjacent pairs of channels 31 and 41 are isolated from each other by the shielding wall 33 and this causes the electromotive force induced between the coils 32 and 42 of the channels 31 and 41, which face to each other, to make the electricity be transferred to a coil 32 or 42 of high electric potential to the other coil 42 or 32 of low electric potential, moreover, to be prevented from leaking out to the adjacent pair of channels 31 and 41.

As described above, the present invention provides a rotary transformer assembly, comprising a transformer rotor and a transformer stator, of a rotary head drum device which is provided with a plurality of shielding walls each disposed between adjacent pairs of channels, each pair of channels comprising a channel of the transformer rotor and a channel of the transformer stator facing to the above channel of the transformer rotor, in order to isolate the adjacent pairs of channels from each other and to prevent a leakage of electromotive force between the adjacent pairs of channels, thereby preventing generation of a cross torque caused by the leakage of electromotive force between the adjacent pairs of channels and, in this respect, preventing a mutual interference of the video signals between the adjacent pairs of channels. In addition, this rotary transformer assembly can be widely used for preventing the generation of the cross torque in several types of final products, for example, a video cassette recorder and an integrated system of camera and video cassette recorder, which is generally equipped with a rotary transformer assembly.

Although the preferred embodiments of the present invention have been disclosed for illustrative purposes, those skilled in the art will appreciate that various mortifications, additions and substitutions are possible, without departing from the scope and spirit of the invention as disclosed in the accompanying claims.

What is claimed is:

1. A rotary transformer assembly of a rotary head drum device, comprising a transformer rotor, mountable on an upper rotary drum of said device, and a transformer stator, mountable on a lower stationary drum of said device, said transformer rotor and transformer stator being disposed so as to face each other with a predetermined space formed therebetween and having at their facing surfaces a plurality of channels, respectively, said channels being so disposed that each channel of the transformer rotor faces a corresponding channel of the transformer stator in order to provide pairs of channels, the assembly comprising:

a plurality of concentric circular shielding walls for isolating adjacent ones of said pairs of channels from each other so as to prevent leakage of electromotive force between said adjacent pairs of channels, said shielding walls being provided at one of the transformer rotor and the transformer stator, protruding at an outer side of an outermost channel, at an inner side of an innermost channel and at a position between each of said adjacent pairs of channels; and a plurality of concentric circular slots for receiving the ends of said shielding walls so as to isolate the adjacent pairs of channels from each other with the shielding walls, each said slot being provided at a portion, corresponding to each shielding wall, of the other of the transformer rotor and the transformer stator.

2. The rotary transformer assembly of claim 1, wherein the shielding walls are rectangularly shaped.

3. The rotary transformer assembly of claim 1, wherein the shielding walls are triangularly shaped.

* * * * *